United States Patent [19]
Smith

[11] Patent Number: 5,297,378
[45] Date of Patent: Mar. 29, 1994

[54] SUSPENSION MECHANISM FOR REEL MOWERS

[75] Inventor: Larry N. Smith, Beaver Dam, Wis.

[73] Assignee: Deere & Company, Moline, Ill.

[21] Appl. No.: 882,340

[22] Filed: May 13, 1992

[51] Int. Cl.⁵ .................... A01D 34/44; A01D 34/86
[52] U.S. Cl. .......................... 56/7; 56/11.9;
56/15.9; 56/DIG. 22
[58] Field of Search ............ 56/6, 7, 14.9, 15.9, 56/16.3, DIG. 22, 228, 11.9

[56] References Cited

U.S. PATENT DOCUMENTS

| | | | |
|---|---|---|---|
| 1,900,726 | 3/1993 | Moyer | 56/7 |
| 3,824,772 | 7/1974 | Sorenson et al. | 56/7 |
| 4,178,741 | 12/1979 | Lonn et al. | 56/7 |
| 4,370,846 | 2/1983 | Arnold | 56/6 |
| 4,769,976 | 9/1988 | Bassett et al. | 56/7 |
| 4,864,805 | 9/1989 | Hager et al. | 56/11.9 |
| 5,042,236 | 8/1991 | Lamusga et al. | 56/7 |
| 5,146,733 | 9/1992 | Klaeger | 56/6 |

FOREIGN PATENT DOCUMENTS

| | | | |
|---|---|---|---|
| 159259 | 2/1979 | Netherlands | 56/7 |
| 1606738 | 11/1981 | United Kingdom | |
| 2151446 | 7/1985 | United Kingdom | |

OTHER PUBLICATIONS

Sales brochure entitled: "Toro Reelmaster 223-D"; published in 1990 by The Toro Company, front cover and p. 1.

*Primary Examiner*—David J. Bagnell

[57] ABSTRACT

A suspension mechanism for a reel mower vehicle, having arm members coupled between a vehicle and a cutting unit, a lever member coupled with each arm member, and a hydraulic cylinder coupled the lever member. A hydraulic circuit actuates the cylinders for lifting the arm members and cutting units to a transport position. A variable restriction valve is provided for causing the cylinders to apply a downforce to the arm members and cutting units for securing the cutting units against the ground over irregular ground conditions, and is adjustable for varying the magnitude of the downforce.

23 Claims, 4 Drawing Sheets

SUSPENSION MECHANISM FOR REEL MOWERS

BACKGROUND OF THE INVENTION

This invention relates to reel mower cutting units and the mechanisms that attach reel mowers to vehicles. Conventional reel mower vehicles include a plurality of arm members that extend from the vehicle, each arm having a reel-type cutting unit attached to its outer end portion. The reel-type cutting units typically include front and rear rollers that carry the cutting units across the surface of the ground during mowing operation. The blades of the rotating reel interact with a bedknife to cut grass or other vegetation with a scissoring action.

Many conventional mowing vehicles allow the weight of the cutting unit and arm to maintain the cutting unit in contact with the ground during mowing operations. However, when relatively high traveling speeds are achieved during mowing operations, the cutting unit can tend to bounce up or rise out of contact with the ground when irregular ground conditions are encountered. In an attempt to reduce bouncing of the cutting unit, springs have been coupled between the vehicle and the arm member for pressing the arm down and thereby biasing the cutting unit against the ground. However, conventional spring downloading mechanisms have several disadvantages. The force exerted by the springs will vary as the length of the spring changes. Therefore, as the cutting unit and arm shift up and down relative to the vehicle as ground irregularities or bumps are encountered, the spring will stretch or contract, resulting in a varying downforce being applied. The height at which the grass is cut can be affected by the difference in downforce applied by the spring, and the quality of cut may be adversely affected. Also, in order to adjust the amount of the downforce to adapt to different mowing conditions, mowing operations must be stopped, and the length of the spring must be adjusted. Therefore, springs used to supply downforce to arm members generally do not allow for adjustments "on-the-go", and require mowing operations to be interrupted for adjustment of the downforce. An additional disadvantage of spring downloading mechanisms is that, if they are adjustable for varying the magnitude of the downforce, the range within which they are adjustable is relatively small, since a particular spring can only be compressed or extended so far. Springs may also tend to add manufacturing and assembly costs to the vehicle.

It would therefore be desirable to provide a mechanism for coupling a cutting unit with a vehicle, and that is adapted to both lift the cutting units during transport, and to press the cutting unit downwardly against the ground during mowing operations. It would be desirable for such a mechanism to provide a constant downforce to the cutting units during mowing operations such that the cut quality is enhanced. Furthermore, it would be desirable for an operator of such a mechanism to be able to make adjustments during mowing operations to change the amount of downforce imparted to the cutting units without interrupting the forward travel of the vehicle. It would also be desirable for such a mechanism to be capable of being manufactured and assembled at relatively low cost.

SUMMARY OF THE INVENTION

The preferred embodiment of the present invention includes an arm member coupled between a vehicle and a cutting unit. A hydraulic cylinder is coupled with a lever member which is coupled with the pivotal arm member. The cylinders are coupled with a hydraulic circuit that allows the operator to actuate the cylinders for lifting the arm members to a transport position whereat the cutting units are held a distance above the ground. The operator can also control the hydraulic circuit to cause the cylinders to apply a downforce to the arm members, thereby urging the cutting units toward and against the ground. The hydraulic circuit according to the present invention includes a variable restriction valve which can be controlled by the operator for infinite adjustment of the downforce over a relatively large range. The variable restriction valve may be positioned in the operator station to allow the operator to adjust the amount of downforce without interrupting mowing operations.

DESCRIPTION OF THE PREFERRED EMBODIMENT

Figure 1:
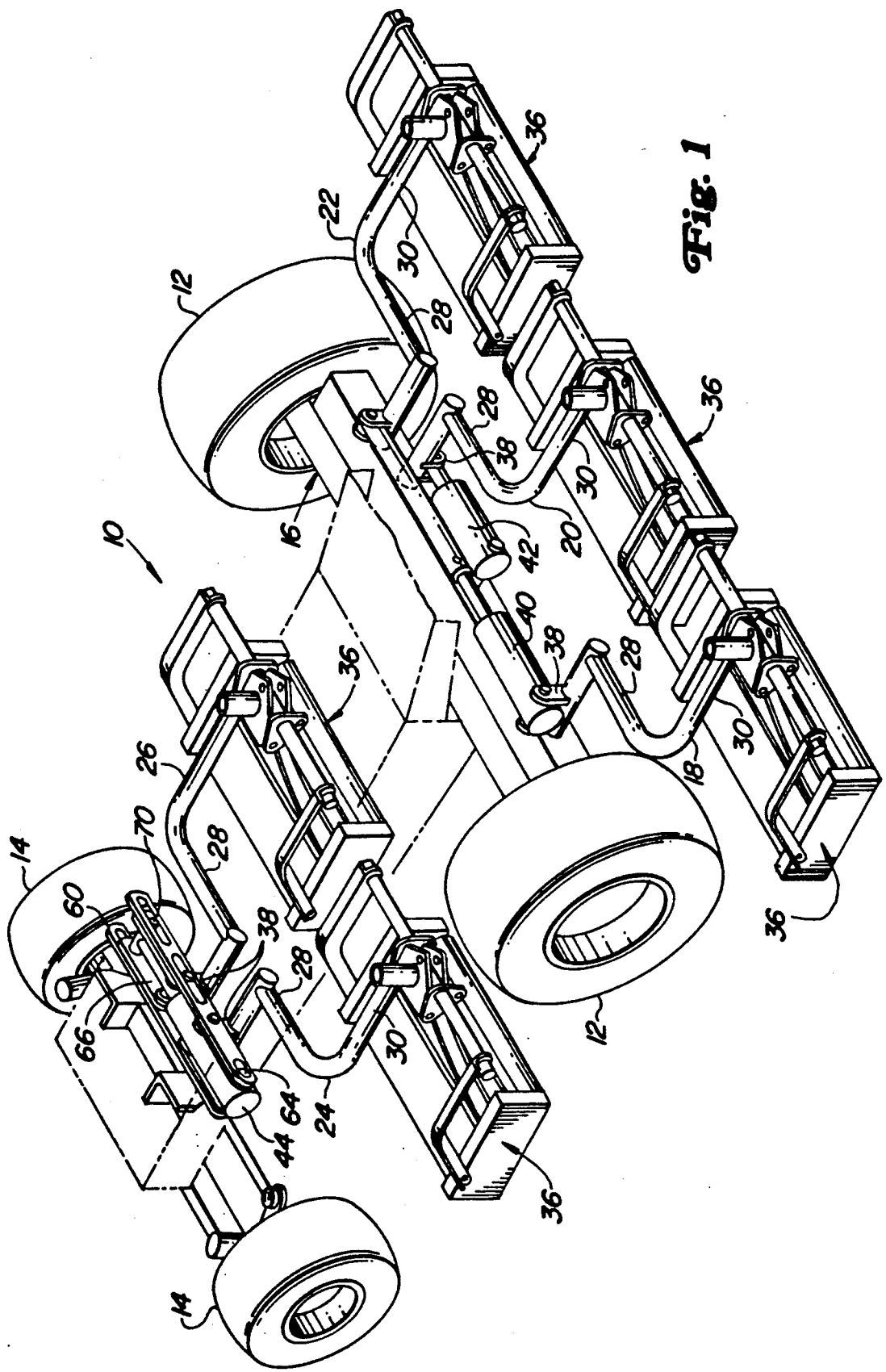
FIG. 1 is a partial perspective view of a mowing vehicle according to the preferred embodiment of the present invention.
Figure 2:
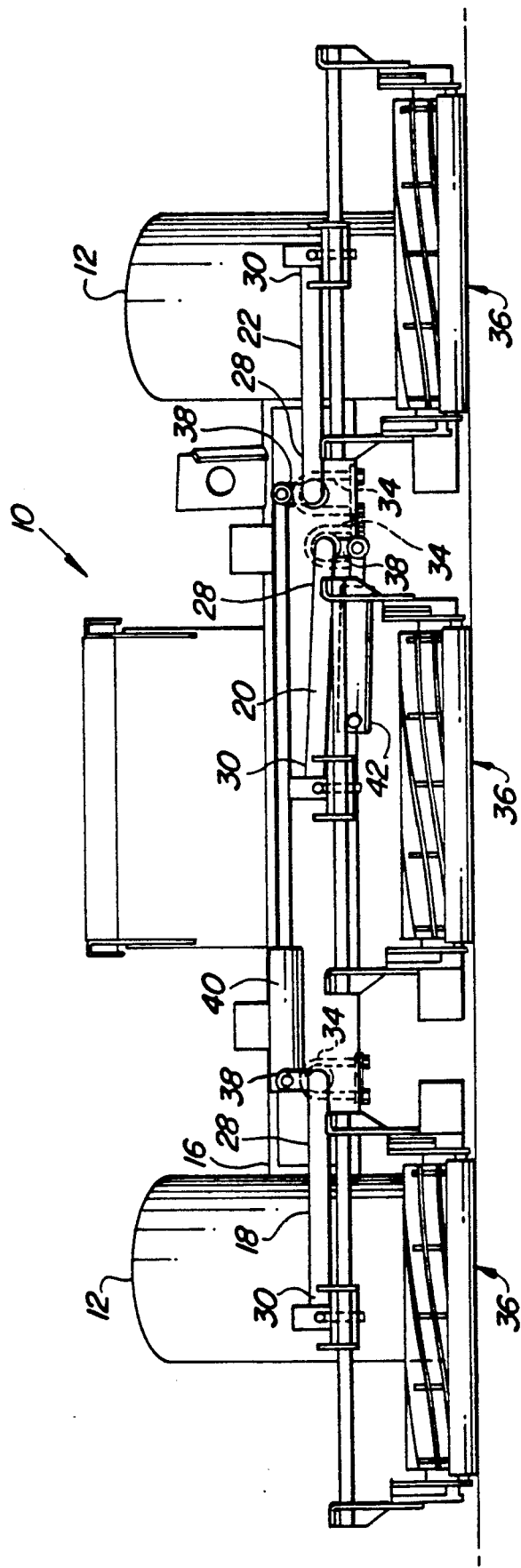
FIG. 2 is a front view of the mowing vehicle.
Figure 3:
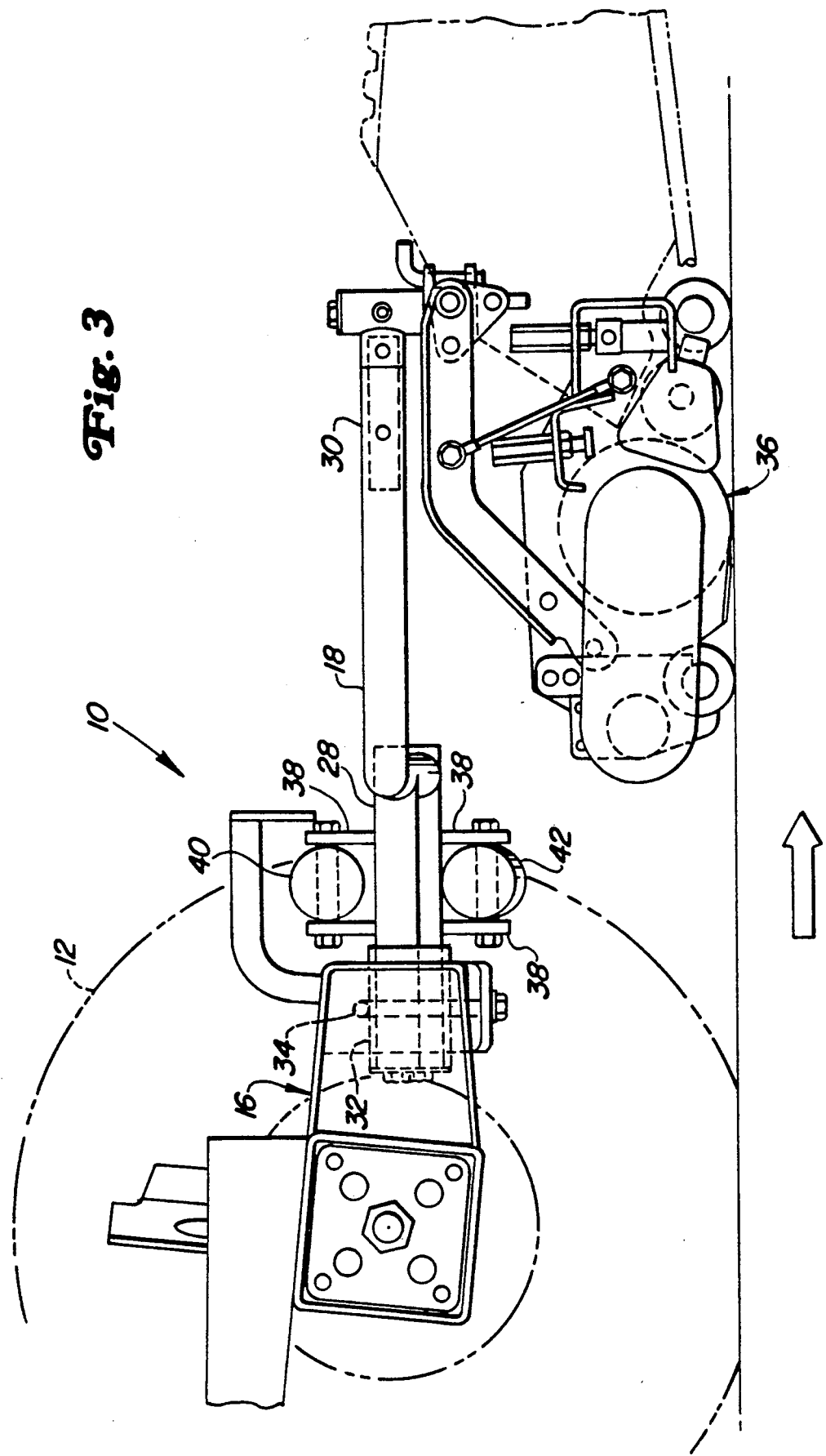
FIG. 3 is a side view of the front portion of the mowing vehicle.

Referring now to FIG. 1, there is shown a mowing vehicle 10 according to the preferred embodiment having a pair of front driven wheels 12 and a pair of rear steerable wheels 14. A rigid support structure or single frame 16 extends laterally between the front pair of wheels 12, and generally longitudinally between the front and rear pair of wheels 12 and 14. A plurality of arm means 18, 20, 22, 24 and 26 extend outwardly from the frame 16, and include inner and outer end portions 28 and 30. The inner portions 28 are pivotally carried within bushings 32 which are secured to the frame 16 via U-shaped members 34. The outer end portions 30 are adapted for being operatively coupled with reel mower cutting units 36.

The inner end portions 28 of each arm include a lever member 38 rigidly coupled thereto. According to the preferred embodiment and as seen in FIG. 1, a first hydraulic cylinder 40 is coupled between the lever members of the front outer arms 18 and 22. A second hydraulic cylinder 42 is coupled between the lever member 38 of the front inner arm 20 and a portion of the frame 16. A third hydraulic cylinder 44 is coupled between the lever members 38 of the rear pair of arms 24 and 26. As the hydraulic cylinder mechanisms 40, 42 and 44 contract, the lever members 38 are rotated such that the arm members 18, 20, 22, 24 and 26 thereattached are lifted. As the hydraulic cylinders 40, 42 and 44 expand, the lever members 38 rotate about respective pivot bushings 32 in such a manner that the respective arms are pressed toward the ground. The force applied to the arms 18–26 via the cylinders 40, 42, 44 and lever members 38 acts to press the cutting units 36 downwardly, thereby maintaining the cutting units 36 in contact with the ground when mowing on bumpy or irregular terrain.

Figure 4:
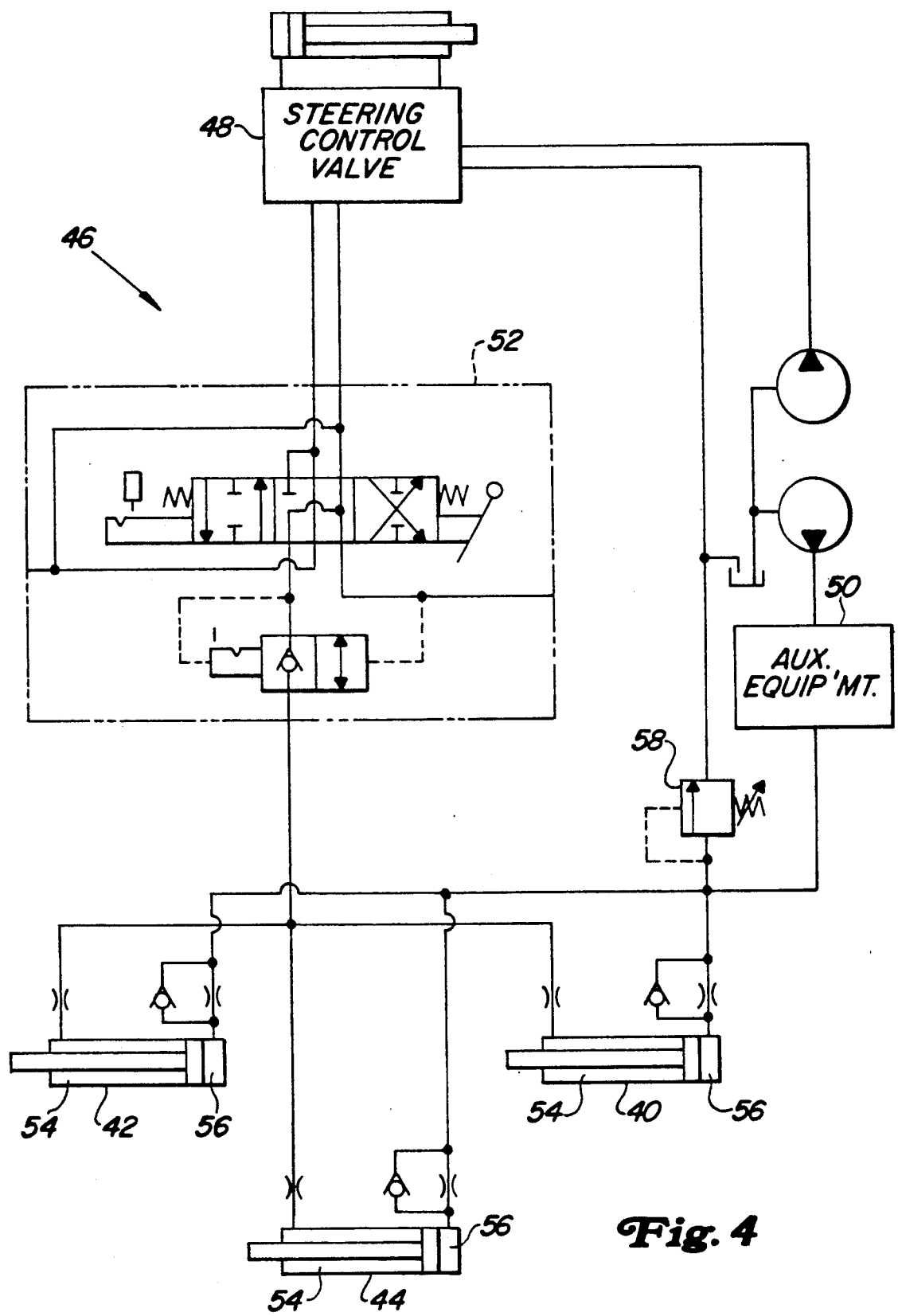
FIG. 4 is a schematic diagram of the hydraulic circuit used in the preferred embodiment of the present invention.

Referring now to FIG. 4, there is shown a schematic representation of the hydraulic circuit 46 used in the preferred embodiment of the present invention. The fluid circuit 46 powers the steering mechanism 48, and also auxiliary mechanisms 50 such as the hydraulic motors which provide power to the reels in the cutting units. The circuit 46 according to the preferred embodiment is also coupled with the three hydraulic cylinders 40, 42, 44. A control valve 52 forms a part of the circuit 46, and can be shifted by the operator for forcing hydraulic fluid into the rod end 54 of the cylinders 40, 42, 44 for lifting the arms 18-26 coupled with the cylinders. The control valve 52 can also be selectively shifted by the operator to allow fluid to flow out of the rod ends 54 of the cylinders 40, 42, 44, which will cause the cylinders to expand and rotate the lever members 38 and arms 18-26 about the pivot mechanism for allowing the cutting units 36 to move to the ground. A variable restriction valve 58 is also provided as part of the hydraulic circuit 46 of the preferred embodiment. The restriction caused by the valve 58 creates a back-pressure in the circuit 46, which will tend to maintain a generally constant pressure in the base end 56 of the cylinders 40, 42, 44 thereby sustaining the downforce on the cutting units 36. The operator can vary the degree of restriction in the valve 58 to adjust the amount of downforce applied to the cutting unit 36 by the cylinders 40, 42, 44.

Referring to FIG. 1, there is shown the mechanism for attaching the third cylinder 44 to the rear lever members 38. A pair of rail members 60 are pivotally coupled with the lever members 38 of the right rear arm 24. A slotted opening is provided in the rail 60 for receiving a pin 64 carried by the base end 56 of the third cylinder 44. A pair of link members 66 are coupled with the lever members 38 of the left rear arm 26. A slotted opening is provided in the link member 66 for receiving a pin 70 carried by the rod of the third cylinder mechanism 44. As the third cylinder mechanism 44 expands, the pins 64 and 70 move apart from each other, and the rail member 60 and link member 66 cause the respective rear lever members 38 to pivot outwardly away from each other. The rear arms 24 and 26 thereby urge the rear cutting units 36 toward the ground. As the third cylinder 44 retracts, the pins 64 and 70 shift toward each other, and the links 66 and rails 60 act to pivot the respective rear lever members 38 toward each other. The rear arms 24 and 26 are thereby lifted to a transport position. The openings formed in the rail 60 and link members 66 for receiving the pins 64 and 70 are slotted or elongated to provide a lost motion function, and therefore cause the rear arms 24 and 26 to be lifted a short time period after the front lift arms 18, 20 and 22 have been lifted. In other words, when the operator initiates the lift operation, the front arms 18, 20 and 22 begin lifting the front cutting units 36, and the rear arms 24 and 26 remain in a lowered position until the pins 64 and 70 travel to the ends of the sloted openings. The rear arms 24 and 26 then begin to lift. As an operator approaches the boundry of the fairway or other area being moweed, he initiates the lift operation as the front cutting units are about to reach the boundry. As the vehicle 10 continues traveling forward, the front cutting units are lifted and the rear units remain on the ground in cutting position. The sequencing feature of the sloted openings acts to raise the rear cutting units when they get closer to the boundry. The other slots formed in the rails 60 slidably receive the pin 70 and lever member 38 of the left rear arm 26, and merely serve to maintain the third cylinder mechanism 44 in level alignment throughout the cylinder's range of expansion and retraction.

The hydraulic cylinders 40, 42, 44 according to the present invention provide both a lifting force and a downward force to the cutting units 36. By serving both functions, extra structure such as downloading springs are eliminated. The cost of manufacturing and assembling the mechanism is correspondingly reduced. Furthermore, the downforce applied by the present invention can be adjusted by the operator by manipulating the variable restriction valve 58. The variable restriction can be adjusted during forward travel of the vehicle 10, and therefore allows for adjustment of the downforce without interruption of mowing operations. The use of cylinders allows the downforce to be adjusted over a relatively large range. The upper limit of the downforce the cylinder can transfer to an arm is dependent on such factors as the amount of pressure the hydraulic pump can generate, and the amount of pressure the cylinder and other componentry of the hydraulic circuit can withstand. Spring downforce mechanisms on the other hand, only allow a relatively small range of adjustments, since a particular spring can only be extended or compressed so far.

Furthermore, the variable restriction valve 58 according to the present invention allows the operator to infinitely adjust the amount of downforce applied to the cutting units 36 by the cylinders 40, 42 and 44. The fine degree of adjustment provided by the present invention allows the operator to select a downforce that is precisely suited for the particular operating conditions. Also, the use of hydraulic cylinders 40, 42 and 44 allows the downforce to remain relatively constant even when the arms 18, 20, 22, 24 and 26 rise up and down over ground undulations. The pressure in the base end 56 of the cylinders will remain generally constant regardless of the position of the pistons within the cylinders, and therefore the downforce will remain generally constant. The preferred embodiment uses a single variable restriction valve 58 for creating the backpressure in the base ends 56 of all three cylinders 40, 42, 44, which are arranged in parallel. The number of parts is thereby reduced, and the cost of manufacture and assembly of the mechanism is correspondingly reduced. Furthermore, since a single restrictor valve 58 is used, the operator is able to adjust the downforce applied to the cutting units with a single operation.

The preferred embodiment of the present invention provides cylinders 40, 42, 44 which are coupled at 90° angles with the lever members 38. The moment arm created as the cylinder 40, 42 or 44 applies a force to the lever arm 38 is therefore maximized, and less force is required to shift or bias the arms. As the cutting units 36 shift up or down as ground undulations are encountered, the lever member 38 will pivot to a position that is not 90° with the cylinder. However, since the lever member 38 was at 90° with the cylinder when on level ground, the lever member 38 will only shift a small angle from the desired or ideal 90° when bumps or dips in the ground are encountered. The moment arm therefore remains relatively large even when undulations are encountered, and the force that must be applied to the lever member 38 by the cylinder to yield a given downloading is relatively small. Since the hydraulic cylinders are only required to apply a relatively small force, smaller, less costly cylinders and hydraulic componentry can be used.

The preferred embodiment shows only three hydraulic cylinders 40, 42 and 44 for applying force to a total of five cutting units 36. The rear cylinder 44 extends directly between the lever members 38 of the rear arms 24 and 26, as opposed to a pair of rear cylinders being coupled between respective rear lever arms 38 and the frame 16. The use of a single rear cylinder 44 that extends between the lever members 38 of the rear arms 24 and 26 therefore reduces the number of cylinders required to accomplish the lifting and downloading functions. The cost of manufacturing and assembling the vehicle is therefore reduced. Similarly, the outer front arms 18 and 22 have a single hydraulic cylinder 40 coupled between the outer lever members 38 for affecting the lifting and downloading functions. However, the vehicle could be provided with five cylinders, with each lever arm 38 having a different cylinder attached to it. If five cylinders are used, then one end of each cylinder would be coupled with the frame 16 instead of another lever member 38.

The preferred embodiment shows hydraulic cylinders 40, 42 and 44 that are extendable to provide downforce to the cutting units 36, and are retractable to lift the cutting units 36 to a transport mode. However, the present invention could also be provided with lever members or cylinders positioned in different configurations than those shown, such that the mechanism would retract to provide a downforce and extend to lift the cutting units.

I claim:

1. A mechanism for attaching a cutting unit to a vehicle, comprising:
   an arm means having a first end portion coupled with the vehicle, said arm means having a second end portion adapted for shifting up and down with respect to the vehicle,
   a cutting unit operatively coupled to the second end portion and engagable with the ground, and
   a hydraulic cylinder means operatively coupled between the arm means and the vehicle for selectively applying a force to the arm means to urge the second end portion of the arm means downwardly for pressing the cutting unit against the ground during cutting operations, said cylinder means also being adapted for lifting the second end portion of the arm means for selectively lifting and maintaining the cutting unit above the ground during vehicle transport.

2. The invention of claim 1, wherein the cutting unit is a reel mower.

3. The invention of claim 1, wherein the cylinder means applies a generally constant force to the arm means regardless of the pivotal position of the arm means due to undulations in ground contour.

4. The invention of claim 1, and further comprising means for adjusting the force exerted by the cylinder means on the arm means during operation of the vehicle.

5. The invention of claim 4, wherein said adjusting means is an infinitely adjustable, variable restriction valve.

6. The invention of claim 4, and further comprising:
   a hydraulic circuit coupled with the cylinder, and
   said control means further comprises a variable restriction valve coupled with the hydraulic circuit and selectively adjustable to vary the downforce applied by the cylinder to the arm means and cutting unit.

7. The invention of claim 6, wherein the variable restriction valve is infinitely variable.

8. The invention of claim 1, wherein the cylinder means applies a generally constant force to the arm means regardless of the pivotal position of the arm means due to ground undulations, and
   means is provided for adjusting the force exerted by the cylinder means on the arm means during operation of the vehicle.

9. The invention of claim 1, wherein the cylinder means is extended to urge the second end portion of the arm means and the cutting unit toward the ground, and is retracted to lift the cutting unit above the ground.

10. A mechanism for attaching a cutting unit to a vehicle, comprising:
    a pair of arm means coupled with the vehicle and extending from the vehicle in generally opposite directions, each of said arm means having a first end portion pivotally coupled with the vehicle, and a second end portion opposite the first end portion,
    a pair of cutting units operatively coupled with the second end portion of the arm means and engagable with the ground during operation, and
    a hydraulic cylinder means coupled with and extending between the pair of arm means and selectively operable to lift both arm means to a transport position with the cutting units lifted from the ground, said cylinder also being selectively operable to urge the second portions of each arm means downwardly during operation for urging the second end portions and cutting units toward the ground.

11. The invention of claim 10, wherein the cylinder means applies a generally constant force to both arm means regardless of the pivotal position of the arm means due to undulations in ground contour.

12. The invention of claim 10, and further comprising means for adjusting the force exerted by the cylinder means on the arm means during operation of the vehicle.

13. The invention of claim 12, and further comprising:
    a hydraulic circuit coupled with the cylinder, and
    said adjusting means further comprises a variable restriction valve coupled with the hydraulic circuit and selectively adjustable to vary the downforce applied by the cylinder to the arm means and cutting unit.

14. The invention of claim 10, wherein the cylinder means applies a generally constant force to both arm means' regardless of the pivotal position of the arm means' due to ground undulations, and
    means is provided for adjusting the force exerted by the cylinder means on the arm means during operation of the vehicle.

15. The invention of claim 10 wherein the cylinder means extends to urge the second end portion of both arm means and the cutting units toward the ground, and retracts to lift both cutting units above the ground.

16. A mowing vehicle, comprising:
    a pair of front wheels,
    at least one rear wheel,
    a frame extending between the pair of front wheels, and extending between the front wheels and the rear wheel,
    three front arm means pivotally coupled with the frame generally between the front wheels, said front arms extending generally forwardly from the vehicle for being coupled with cutting units, and including two outer arm means and an inner arm means, lever members coupled with each arm means, a first hydraulic cylinder extends between the lever members of the outer arm members, said first hydraulic cylinder being shiftable for lifting the outer arm means and for urging the outer arm means to pivot toward the ground, a second hydraulic cylinder means coupled between the frame and the lever member of the inner arm means, said hydraulic cylinder being shiftable for lifting the inner arm means and for urging the inner arm means to pivot toward the ground to urge the cutting units against the ground.

17. The invention of claim 16, and further comprising:

a rear pair of arm means pivotally carried by the frame at a location generally to the rear of the front arm means, said rear arms each being coupled with a respective rear cutting unit, lever members coupled with each of the rear arm means, a rear hydraulic cylinder coupled between the lever members of the rear arm means, said rear hydraulic cylinder being shiftable to lift both rear arm members and to urge both rear arm means toward the ground to urge the rear cutting units against the ground.

18. A mechanism for attaching a cutting unit to a vehicle, comprising:

an arm means having a first end portion coupled with the vehicle, said arm means having a second end portion opposite the first end portion and adapted for shifting up and down with respect to the vehicle, a reel mower cutting unit being coupled to the second end portion and engagable with the ground, and a hydraulic cylinder means operatively coupled between the arm means and the vehicle for selectively applying a force to the arm means to urge the second end portion of the arm means downwardly for pressing the cutting unit into engagement with the ground during cutting operations, said cylinder means applying a generally constant force to the arm means regardless of the pivotal position of the arm means due to undulations in ground contour, said cylinder means also being adapted for lifting the second end portion of the arm means for selectively lifting and maintaining the cutting unit above the ground during vehicle transport, and means for adjusting the force exerted by the cylinder means on the arm means during operation of the vehicle.

19. A mechanism for attaching a cutting unit to a vehicle, comprising:

an arm means having a first end portion coupled with the vehicle, said arm means having a second end portion opposite the first end portion and adapted for shifting up and down with respect to the vehicle, a reel mower cutting unit being coupled to the second end portion and engagable with the ground, and a hydraulic cylinder means operatively coupled between the arm means and the vehicle for selectively applying a force to the arm means to urge the second end portion of the arm means downwardly for pressing the cutting unit into engagement with the ground during cutting operations, said cylinder means applying a generally constant force to the arm means regardless of the pivotal position of the arm means due to undulations in ground contour, said cylinder means also being adapted for lifting the second end portion of the arm means for selectively lifting and maintaining the cutting unit above the ground during vehicle transport, and an infinitely adjustable, variable restriction valve for adjusting the force exerted by the cylinder means on the arm means during operation of the vehicle.

20. A mechanism for attaching a cutting unit to a vehicle, comprising:

an arm means having a first end portion coupled with the vehicle, said arm means having a second end portion opposite the first end portion and adapted for shifting up and down with respect to the vehicle, a reel mower cutting unit being coupled to the second end portion and engagable with the ground, and a hydraulic cylinder means operatively coupled between the arm means and the vehicle for selectively applying a force to the arm means to urge the second end portion of the arm means downwardly for pressing the cutting unit into engagement with the ground during cutting operations, said cylinder means applying a generally constant force to the arm means regardless of the pivotal position of the arm means due to undulations in ground contour, said cylinder means also being adapted for lifting the second end portion of the arm means for selectively lifting and maintaining the cutting unit above the ground during vehicle transport, and means for adjusting the force exerted by the cylinder means on the arm means during operation of the vehicle.

21. A mechanism for attaching a cutting unit to a vehicle, comprising:

an arm means having a first end portion coupled with the vehicle, said arm means having a second end portion opposite the first end portion and adapted for shifting up and down with respect to the vehicle, a reel mower cutting unit being coupled to the second end portion and engagable with the ground, and a hydraulic cylinder means operatively coupled between the arm means and the vehicle for selectively applying a force to the arm means to urge the second end portion of the arm means downwardly for pressing the cutting unit into engagement with the ground during cutting operations, said cylinder means applying a generally constant force to the arm means regardless of the pivotal position of the arm means due to undulations in ground contour, said cylinder means also being adapted for lifting the second end portion of the arm means for selectively lifting and maintaining the cutting unit above the ground during vehicle transport, said cylinder means being extendable to urge the second end portion of the arm means and the cutting unit toward the ground and retractable to lift the cutting unit above the ground.

22. A mechanism for attaching a cutting unit to a vehicle, comprising:

an arm means having a first end portion coupled with the vehicle, said arm means having a second end portion opposite the first end portion and adapted for shifting up and down with respect to the vehicle, a reel mower cutting unit being coupled to the second end portion and engagable with the ground, and a hydraulic cylinder means operatively coupled between the arm means and the vehicle for selectively applying a force to the arm means to urge the second end portion of the arm means downwardly for pressing the cutting unit into engagement with the ground during cutting operations, said cylinder means applying a generally constant force to the arm means regardless of the pivotal position of the arm means due to undulations in ground contour, said cylinder means also being adapted for lifting the second end portion of the arm means for selectively lifting and maintaining the cutting unit above the ground during vehicle transport, a hydraulic circuit coupled with the cylinder, and a variable restriction valve coupled with the hydraulic circuit and selectively adjustable to vary the downforce applied by the cylinder to the arm means and cutting unit.

23. A mechanism for attaching a cutting unit to a vehicle, comprising:

an arm means having a first end portion coupled with the vehicle, said arm means having a second end portion opposite the first end portion and adapted for shifting up and down with respect to the vehicle, a reel mower cutting unit being coupled to the second end portion and engagable with the ground, and a hydraulic cylinder means operatively coupled between the arm means and the vehicle for selectively applying a force to the arm means to urge the second end portion of the arm means downwardly for pressing the cutting unit into engagement with the ground during cutting operations, said cylinder means applying a generally constant force to the arm means regardless of the pivotal position of the arm means due to undulations in ground contour, said cylinder means also being adapted for lifting the second end portion of the arm means for selectively lifting and maintaining the cutting unit above the ground during vehicle transport, a hydraulic circuit coupled with the cylinder, and a variable restriction valve coupled with the hydraulic circuit and selectively adjustable to infinitely vary the downforce applied by the cylinder to the arm means and cutting unit.

* * * * *